United States Patent [19]

Kuboichi

[11] 4,423,642

[45] Jan. 3, 1984

[54] ACTUATOR

[75] Inventor: Koichi Kuboichi, Kawasaki, Japan

[73] Assignee: Eagle Industry Co., Ltd., Tokyo, Japan

[21] Appl. No.: 239,282

[22] Filed: Mar. 2, 1981

[51] Int. Cl.³ .................... G05G 17/00; F16K 31/50; F16K 31/56

[52] U.S. Cl. .......................................... 74/2; 251/74; 251/278

[58] Field of Search ................... 74/2; 251/68, 70, 74, 251/278

[56] References Cited

U.S. PATENT DOCUMENTS 2,304,844 12/1942 Parker et al. ........................ 251/68
2,748,229 5/1956 Block .................................. 74/2 X
3,385,559 5/1968 Churchill ............................. 251/70
3,463,443 8/1969 Churchill ............................. 271/70
3,778,027 12/1973 Collins et al. ..................... 251/74 X Primary Examiner—Allan D. Herrmann
Attorney, Agent, or Firm—Jordan and Hamburg

[57] ABSTRACT

An actuator has a driving piston disposed in a cylinder tube and is interlockable with a driving stem, the driving piston being normally biased resiliently downwardly, but when the driving piston is forced upwardly, it is retained against the resilient force of a retaining device. When the driving piston is forced downwardly, the retaining device is released from its retaining action, allowing the piston to descend rapidly by virtue of the resilient force, the driving piston being connected to a valve body of a valve assembly or the like.

9 Claims, 3 Drawing Figures

ACTUATOR

BACKGROUND OF INVENTION

This invention relates to an actuator for valves or the like.

Actuators for valves are mainly pneumatic, motor-driven or hand-operated. In electric and hand-operated actuators, the stem slides along with the rotation of a handle allowing the valve to come into abutment with the valve seat. Thus the valve opening and closing are static and the cut-off relies on a static load. Therefore, when it is desired to close the valve instantaneously, the aforesaid electrical and hand-operated actuators are not employable, so there has been a demand for such electrical and hand-operated actuators which are capable of closing a valve instantaneously.

BRIEF SUMMARY OF INVENTION

In view of the aforesaid demand, it is an object of this invention to provide an actuator of the type wherein a driving piston and a valve body of a valve assembly or the like are connected together and wherein a hand-operated actuator is capable of closing a valve instantaneously, imparting an impact force at the time of valve closing to effect dynamic valve closing. It is another object of this invention to provide an electrical actuator having the same function as above.

In this invention, in order to achieve the above-mentioned objects, a driving piston is inserted slidably into a cylinder tube, a hole is formed in the driving piston, into which is slidable inserted a driving stem so as advance and retract therein, the driving stem being formed at the lower end of a driving shaft which extends from the upper end of the cylinder tube to the interior of the tube, the driving stem being advanced or retracted by the responsive action of a sliding shaft operable by suitable means. The driving piston is normally biased resiliently downwardly, and when the driving piston is forced up it is retained against the resilient force by retaining means attached to the cylinder tube, the retaining means being adapted to be disengaged by releasing means which is attached to the driving piston and which is adapted to be operated when the driving stem descends so that the driving piston is allowed to descend rapidly by virtue of the resilience.

A brief summary of this invention has been given above. The above and further objects and novel features of the invention will more fully appear from the following detailed description when the same is read in connection with the embodiment shown in the accompanying drawings. It is to be understood, however, that the drawings merely shows an embodiment for illustration of the invention and is not intended to limit the scope of the invention.

DESCRIPTION OF PREFERRED EMBODIMENTS

Figure 1:
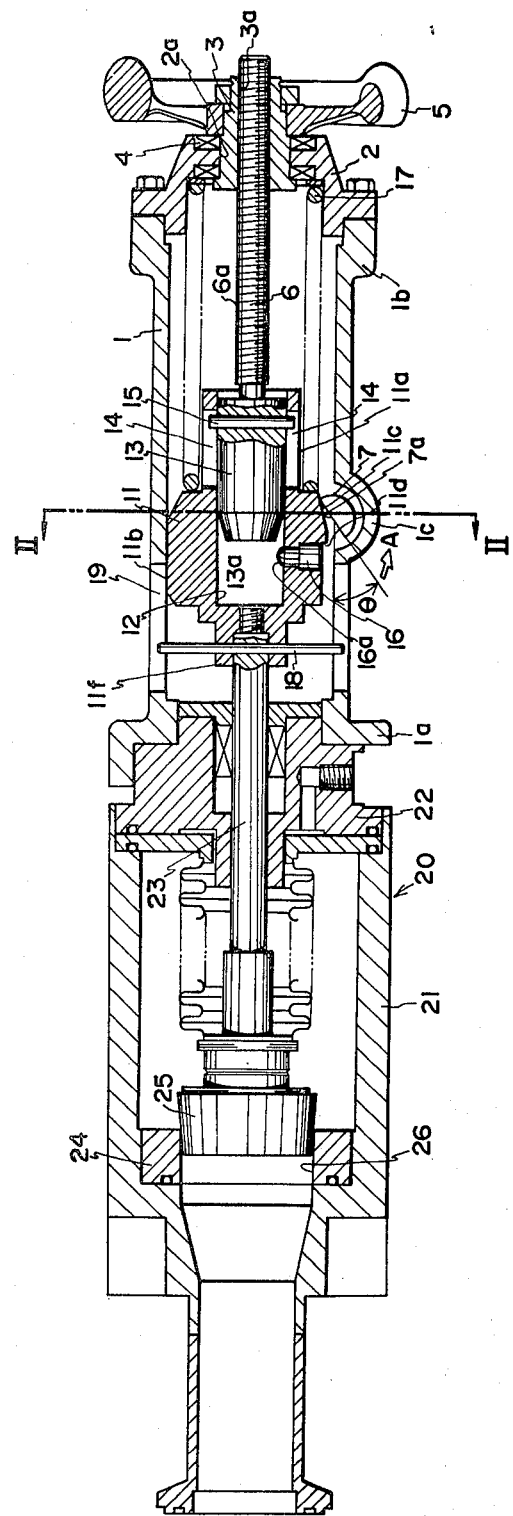
FIG. 1 is a sectional view of an actuator embodying the invention attached to a valve and shown in a closed condition.
Figure 2:
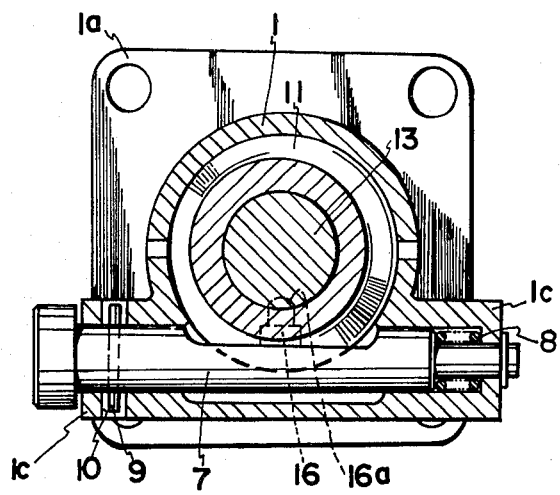
FIG. 2 is a sectional view taken on line II—II of FIG. 1.
Figure 3:
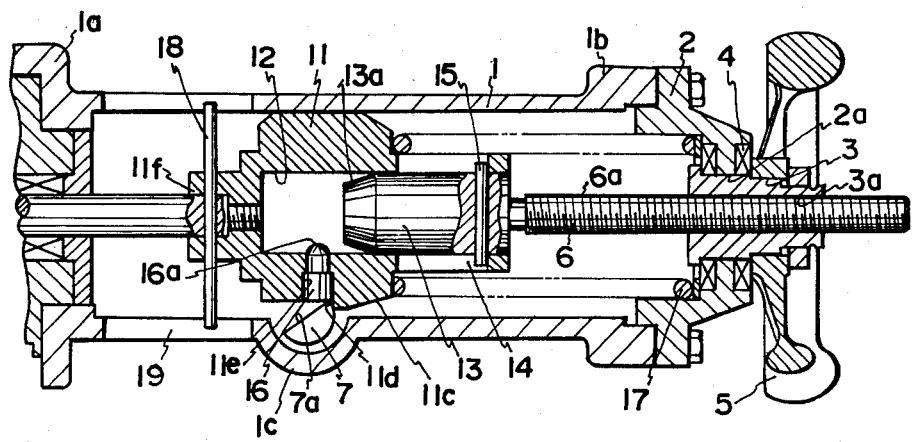
FIG. 3 is a sectional view partly broken away of the actuator attached to the valve and shown in a retracted or open condition.

As illustrated in the accompanying drawings, the reference numeral (1) is a cylinder tube with a flange (1a) formed at the lower end thereof to which is connected a valve portion as will be explained later, while at the upper end of the cylinder tube (1) is formed a flange (1b) to which is fixed a cylinder head (2). Along the axis of the cylinder head (2) is formed an axial bore (2a) within which is mounted a handle stem (3) rotatable through the medium of a bearing (4). Fitted over the outer end of the handle stem (3) is a handle (5) whereby the handle stem (3) can be turned to the right or left. Along the axis of the handle stem (3) are formed internal threads (3a), while external threads (6a) are formed on the outer periphery of a sliding shaft (6) which extends into the cylinder tube (1). Both threads (3a) and (6a) are engaged, and by such threaded action the sliding shaft (6) is advanced or retreated in the axial direction. The numeral (7) designates a rotatably mounted retaining shaft normal to the cylinder axis so as to partly project from the inside diameter of the cylinder tube (1) in at an intermediate point of the tube. The retaining shaft (7) is held rotatably with respect to bearings (1c)(1c') formed on one side of the cylinder tube (1), and it is resiliently biased in the direction of the arrow mark (A) in FIG. 1 by means of a torsion spring (8) which is interposed between the bearing (1c) and the retaining shaft (7). The retaining shaft (7) has a pivoting range ($\theta$) obtained by a pin (9) inserted through the shaft (7) and a slit hole (10) formed in the bearing (1c'), and it is resiliently held so that a flat retaining surface (7a) formed at the central part of the retaining shaft (7) slightly faces inwardly.

The numeral (11) designates a driving piston which is inserted slidably into the cylinder tube (1). The driving piston (11) has a hole (12) formed along the axis thereof into which is inserted a driving stem (13) which is fixed to or formed integrally with the lower end of the sliding shaft (6). In a tubular portion (11a) of driving piston (11) there are formed long holes (14) (14) which are engaged by a guide pin (15) which projects transversely of the driving stem (13), thus affording a sliding range. The driving piston (11) is further provided with a sliding portion (11b) the upper end of which forms a tapered surface (11c) disposed so as to push the retaining surface (7a) of the retaining shaft (7) until the latter is moved rotatably against the bias of the torsion spring (8). On one lower side of the tapered surface (11c) opposed to the retaining surface (7a) there is formed a retaining stepped portion (11d), and adjacent thereto there is formed a traverse recess (11e) within which is projectably movable a driven pin (16) having an inner end (16a) adapted to project beyond the inner wall of the sliding hole (12). When it projects, the upper half portion of the retaining surface (7a) of the retaining shaft (7) has its upper edge in engagement with the retaining stepped portion (11d). The inner end (16a) is adapted to engage the tapered surface (13a) formed at the lower end of the driving stem (13), and is forced out by a wedge effect when the driving stem (13) goes down.

The numeral (17) is a coiled spring disposed between the driving piston (11) and the cylinder head (2), whereby the driving piston (11) is resiliently biased downwardly at a suitable pressure, with a lower end (11f) of the driving piston (11) being connected to a rod (23) of the valve portion. A swivel stop pin (18) extends through this coupler portion so as to meet at right angles with the axis, with both ends thereof being slidably fitted in guide holes (19)(19) formed in the cylinder tube (1) whereby rotatable movement of the driving piston (11) with respect to the cylinder tube (1) is prevented.

In the use of the above-constructed actuator, the lower end flange (1a) is connected to the valve portion (20). In this case, the lower end of the driving piston (11) is connected with the upper end of the rod (23) projecting from an end member (22) which is provided at the upper end of a cylinder (21) of the valve portion (20). When the driving piston (11) descends, a valve member (25) fixed to the lower end of the rod (23) abuts a valve seat (24) formed on the inner circumference of the lower end of the cylinder (21), so that a valve hole (26) is blocked.

In operation, when the handle (5) is rotated counterclockwise, the sliding shaft (6) is retracted by the threaded engagement between the internal threads (3a) of the handle stem (3) and the external threads (6a) of the sliding shaft (6), resulting in that the driving stem (13) slides in the direction leaving the sliding hole (12) of the driving piston (11). When the driving stem (13) has gone beyond the sliding range, the guide pins (15)(15) abut one end of the long holes (14)(14) and the driving piston (11) is forced up against the bias of the coiled spring (17), so that the valve member (25) moves away from the valve seat (24) through the medium of the rod (23), thus allowing the valve to open. If the handle (5) is further rotated, the driving piston (11) goes up while the upper edge of the retaining surface (7a) of the retaining shaft (7) is engaged by the tapered surface (11c) until it engages the retaining stepped portion (11d). In this position the valve member (25) is completely retracted from the valve seat (24); that is, the valve portion (20) is in a fully opened condition.

For closing the valve, the handle (5) is rotated clockwise to allow the driving shaft (6) to enter into the cylinder tube (1) so that the driving stem (13) moves towards the inner part of the slide hole (12). On the other hand, the retaining stepped portion (11d) of the driving piston (11) is in engagement with the upper edge of the retaining surface (7a) of the retaining shaft (7), so the driving piston (11) stays in this retained position in a resiliently held condition by the coiled spring (17).

Further rotation of the handle (5) results in that the tapered surface (13a) of the driving stem (13) entering into the slide hole (12) comes into abutment with the inner end (16a) of the drive pin (16), allowing it to be forced out, and the outer end of the drive pin (16) engages the upper half portion of the retaining surface (7a) of the retaining shaft (7). Consequently, the retaining shaft (7) rotates against the bias of the torsion spring (8), and as soon as the upper end portion of the retaining surface (7a) becomes disengaged from the retaining stepped portion (11d) the driving piston (11) descends instantaneously in the cylinder tube (1) due to the resilience of the coiled spring (17), allowing the valve member to abut the valve seat (24) through the medium of the rod (23) so the valve hole (26) is closed.

Although the invention has been described as regards to its preferred embodiments, it is obvious that many modifications and variations, including electric motor-driven actuators, may be made with the invention without departing from the principle thereof. It is therefore intended to cover in the appended claims all such modifications and variations as substantially afford the effects of the invention through the use of a construction substantially identical with or corresponding to the scope of the invention.

I claim:

1. An actuator comprising a cylinder, a stem means mounted for axial movement on said cylinder, a piston slidable in said cylinder, said piston having an internal longitudinal opening, said stem means comprising a stem shaft and a stem end part, said stem end part being slidable in said internal opening in said piston, connecting means slidably connecting said stem means to said piston to provide for free independent movement of said piston relative to said stem means and to provide simultaneous movement of said piston and said stem means, a valve element connected to said piston for opening and closing a valve, biasing means in said cylinder biasing said piston in a first direction in which said valve element closes said valve, and holding-release means having a holding element operable to engage said piston to hold said piston in a first position in which said valve is open, said holding element being mounted and retained on said cylinder as said piston moves in said cylinder, said holding-release means further comprising a release element engageable by said stem end part to release said holding element such that upon such release, said biasing means resiliently drives said piston and said valve element to close said valve.

2. An actuator according to claim 1, wherein said holding element is a longitudinally extending element having its longitudinal axis disposed perpendicular to the axis of said cylinder, said holding-release means further comprising mounting means for rotatably mounting said holding element on said cylinder, and a torsion spring biasingly engaging said holding element in one rotational direction.

3. An actuator according to claim 2, wherein said piston has a stepped portion, said holding element having a flat portion, said torsion spring biasing said holding element in said one rotational direction such that said flat portion of said holding element engages said stepped portion of said piston to thereby retain said piston in said first position.

4. An actuator according to claim 3, wherein said release element comprises a pin element mounted on said piston, said pin element having a longitudinal axis extending perpendicular to the axis of said piston, said pin element being longitudinally slidable to a first position wherein a portion of said pin element projects into said opening in said piston, said pin element being disposed at said stepped part in said piston, said pin element being disposed such that said stem end part is movable in said piston to a position to engage said pin element to move the latter longitudinally and thereby engage said holding element to thereby rotate the latter against the bias of said torsion spring and thereby disengage said holding element from said stepped part so that the piston is thereby released to move said valve element to close said valve.

5. An actuator according to claim 2, wherein said connecting means comprises a sleeve extending from said piston, said sleeve having longitudinally extending slots, said stem end part being at least partially movable in said sleeve, said stem end part having lateral projections extending into said slots such that said stem end part is freely movable in said piston as said projections slide in said slots, said stem end part being movable to a longitudinal position such that said projections engage the ends of said slots, whereby continued longitudinal movement of said stem end part moves said piston to said first position in which said valve is open.

6. An actuator according to claim 5, wherein said biasing means is a spring disposed about said sleeve.

7. An actuator according to claim 6, wherein said projections comprise a pin extending transversely through said stem end part.

8. An actuator according to claim 3, wherein said holding element has at least one part with a semi-circular cross section juxtaposed to said flat portion.

9. An actuator according to claim 8, wherein said piston has a tapered part which engages said flat portion of said holding element when said holding element is disengaged from said stepped portion of said piston.

* * * * *